Jan. 31, 1967 J. R. BENNETT ET AL 3,302,183

MICRO-PROGRAM DIGITAL COMPUTER

Filed Nov. 26, 1963 2 Sheets-Sheet 1

INVENTORS.
JAMES R. BENNET
WILLIAM K. ORR
BY
Christie, Parker & Hale
ATTORNEYS.

United States Patent Office 3,302,183

Patented Jan. 31, 1967

3,302,183
MICRO-PROGRAM DIGITAL COMPUTER

James R. Bennett, Glendora, and William K. Orr, San Leandro, Calif., assignors to Burroughs Corporation, Detroit, Mich., a corporation of Michigan

Filed Nov. 26, 1963, Ser. No. 325,853
5 Claims. (Cl. 340—172.5)

This invention relates to digital computers and, more particularly, to a control unit for a computer in which the sequential operations for a particular instruction are stored in coded form and can be easily modified.

Digital computers are generally arranged to perform a sequence of instructions, known as a program, the sequence of instructions being selected and arranged by the operator or programmer of the computer to solve particular problems. The computer is usually provided by the designer with a list of available instructions, such as add, subtract, etc., which are available to the programmer in devising programs for the computer. To execute a particular instruction requires a number of sequential operations to take place in the computer. Normally these sequential operations, which generally require one clock time interval to perform, are controlled by the wired-in logic of the computer. The programmer of the computer has no control beyond the selection of particular instructions from the available list of instructions to control the machine.

It has been recognized heretofore that if the wired-in logic could be easily modified by the operator of the machine, individual instructions could be modified to satisfy peculiar requirements that a particular programmer might demand.

Various means, such as plug-boards and other matrix switching circuits, have been proposed to make it possible to modify the wired-in logic of the computer. The concept of changing the basic operations that take place during each clock interval or the sequence of these basic operations is referred to as micro-programming and the basic operations are referred to as micro-operators.

The present invention is directed to a computer in which the micro-operators are stored in coded form in a high speed addressable memory device, such as a core memory. A particular instruction, in specifying a particular operation such as an addition, provides a base address for the memory device from which a string of micro-operators are read out in sequence. As each micro-operator is read out, it is decoded, the decoder energizing a particular output line which in turn operates gates within the computer to effect a micro-operation. With changing the instruction, the micro-operators can be changed or the sequence in which they occur can be changed in the memory device by the programmer. New instructions can be provided or existing instructions can be modified to suit the needs of the programmer.

Figures 1, 1A, 1B:
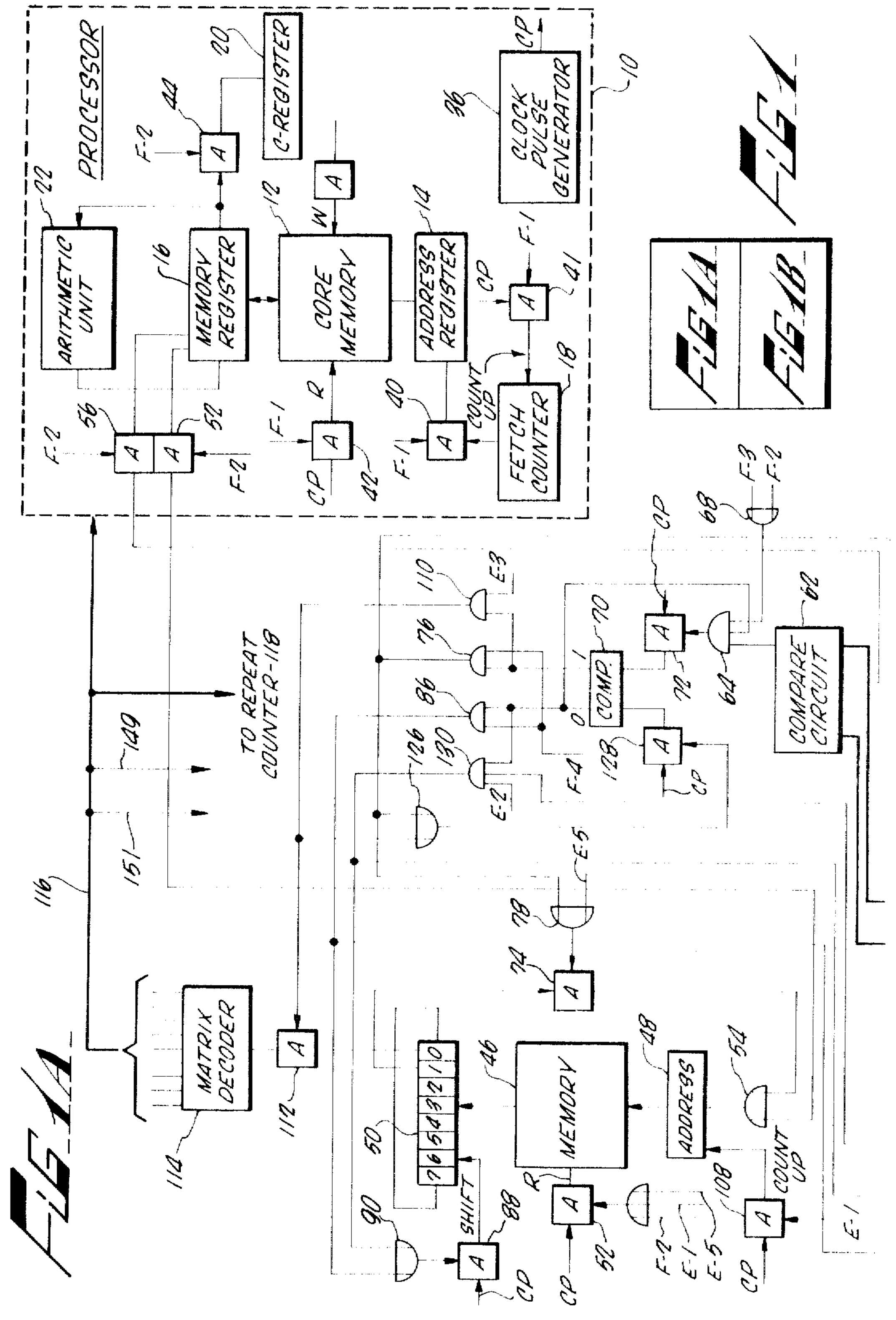
Figure 1B:
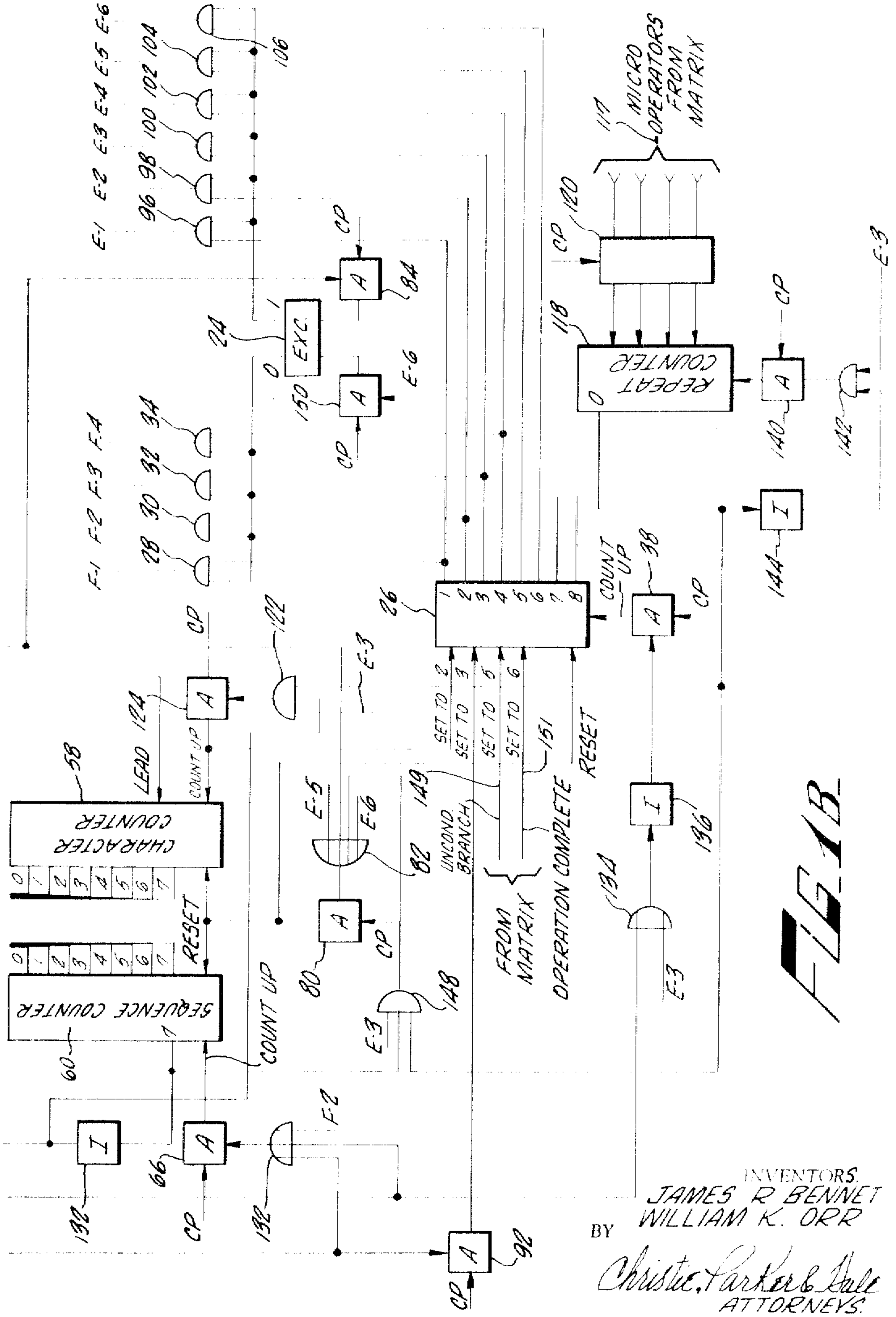

For a more complete understanding of the invention, reference should be made to the accompanying drawings wherein FIGURES 1A and B together show a schematic block diagram of a preferred embodiment of the invention.

Referring to the drawings in detail, the numeral 10 indicates generally a digital processor which in itself may be of conventional design. See, for example, U.S. Patent No. 3,001,708. The processor is shown as including an addressable core memory 12 which stores the single address instructions making up the program for controlling the processor in carrying out a particular problem. The core memory 12 also stores operands to be used in executing particular instructions. The core memory 12 is addressed by an address register 14 for transferring words from selected positions in the core memory to a memory register 16 or for transferring a word from the memory register 16 back into a selected location in the core memory 12. A fetch counter 18 is used to address the instructions in the core memory 12 in sequence, each instruction being transferred out of core memory 12 to the memory register 16 and from there to a C-register 20 where the instruction is stored during the execution of the instruction by the processor. The processor further includes an arithmetic unit 22 by means of which various arithmetic and logical operations are executed in conventional fashion.

The present invention is specifically directed to the control circuitry by which the processor 10 is directed through a sequence of operations in response to each instruction in the program.

In normal operation of the processor, as mentioned above, at the completion of the execution of an instruction, another instruction is selected from the core memory 12 and transferred to the C-register 20 through the memory register 16. This is accomplished in the following manner. At the completion of the execution of an instruction, and Execute flip-flop 24 (see FIGURE 1B) is set to its 0 state and a control counter 26 is reset to its initial state, designated 1. The output of the 1 state of the control counter 26 and the 0 state of the flip-flop 24 are applied to a logical "and" circuit 28, the output of which provides a control level, designated the F–1 control state. The successive states of the control counter 26 are similarly applied to logical "and" gates 30, 32 and 34 together with the 0 state from the flip-flop 24 to provide further control levels, designated F–2, F–3 and F–4.

The control counter 26 is advanced by clock pulses, designated CP, derived from a clock pulse generator 36 in the processor 10. These pulses are passed by an "and" gate 38 which is normally biased open to pass the pulses to the control counter 26. Thus on successive clock pulses, the control counter 26 is advanced, initiating in sequence the control states F–1 through F–4.

During the control state F–1, the contents of the fetch counter 18 are transferred to the address register 14 through an "and" gate 40 to which the F–1 level is applied. A clock pulse applied to the READ input of the core memory 12 through an "and" gate 42, to which the F–1 level is also applied, transfers the addressed instruction to the memory register 16. A gate 41 is opened during the F–1 state to pulse the counter 18 and count it up one.

During the control state F–2, the instruction in the memory register 16 is transferred to the C-register 20 by applying the F–2 level to an "and" gate 44 which couples the register 16 to the register 20. Typically, in a single address computer, the instruction word transferred by the gate 44 includes a group of binary bits which designate the address of an operand in the core memory 12. The instruction also includes a second group of bits which designate the operation to be performed by the processor during the particular instruction, as for example the performing of an addition, a multiplication, or the like. This group of bits is called the "order" portion of the instruction. In known digital computers, such as that described in the above-identified patent, the bits designating the operation to be performed are applied to a decoder which then establishes through wired-in logic of the control unit, the sequence of basic operations that take place during successive clock pulse intervals in the processor to effect the result called for by the instruction. The basic operations which take place during each clock pulse interval, as pointed out above, may be referred to as micro-operations.

According to the present invention, these micro-operations are controlled by coded information stored in a high speed memory, the coded information for each operation being referred to as a micro-operator. The sequence of operations required to execute a particular instruction during a sequence of clock pulse intervals is thus defined by a group of micro-operators. The bits which normally designate the result to be performed by the processor during a particular instruction, according to the present invention, are utilized as a base address for a group of micro-operators stored in a high speed read-out memory, the micro-operators being called out of the memory in sequence to control the processor during the execution of the particular instruction.

The digitally coded micro-operators are stored in a high speed read-out memory 46. This memory may be a core memory device, a thin film memory device, or other high speed addressable device for storing binary coded information. For example, the memory 46 may store a hundred and twenty-eight words, each word being made up of eight characters of eight binary bits per character. Any one of the hundred and twenty-eight words in the memory 46 may be addressed by placing a binary-coded address in an address register 48 associated with the read-out memory 46. The addressed word is transferred out of the memory 46 to a control word shift register 50 in response to a clock pulse applied through an "and" gate 52 to the memory 46.

During the F–2 control state, three bits of the "order" portion of the instruction in the memory register 16 are transferred by an "and" gate 52 through a logical "or" circuit 54 to the address register 48. These three bits provide an address on one of the first eight words in the memory 46. Each character of the first eight words serves as the base address for a string of micro-operators stored as the coded characters in the remaining words in the memory 46. Three other bits, designating a particular character within the addressed word, are transferred from the "order" portion of the instruction in the memory register 16 through an "and" gate 56 to a character address counter 58. See FIGURE 1B. The counter 58 is thereby set to any preselected value according to which one of the eight characters in the word in the shift register 50 is to be used as the base address for the micro-program.

The selection of the proper character is accomplished as follows. A sequence counter 60 is compared with the character counter 58 by means of a comparison circuit 62, which, on sensing equality, applies an output signal to a logical "and" circuit 64. At the start of the operations, it is assumed that both the counters 58 and 60 are reset to 0. During the F–2 control state, the sequence counter 60 is counted up one by applying a clock pulse together with the F–2 state to an "and" gate 66. The output of the gate 66 counts up the counter 60. Thus at the end of the F–2 state, the sequence counter is at 1 while the character address counter is at a value corresponding to the desired character within the word read out of the memory 46 and placed in the shift register 50.

During the next clock pulse interval, the F–3 level is applied through a logical "or" circuit 68 to the logical "and" circuit 64 together with the 0 state output of a Compare flip-flop 70. If the compare circuit 62 indicates that the two counters 58 and 60 are the same and that the Compare flip-flop 70 is in the 0 state, an "and" gate 72 passes the clock pulse at the end of the F–3 state, setting the Compare flip-flop 70 to the 1 state.

It should be noted that the compare circuit 62 will only provide an output if the character counter 58 has been set from 0 to 1 by the instruction in the memory register 16, since the sequence counter 60 has been advanced from 0 to 1. Assuming the eight characters in the word stored in the shift register 50 are located in positions designated 0 through 7, this indicates that the character in position 1 of the shift register 50 is the desired character.

With the Compare flip-flop 70 set by the clock pulse, during the next clock pulse interval, the control counter 26 advances to 4 providing an output level from the logical "and" circuit 34, designated F–4. During the F–4 control state, the contents of position 1 of the shift register 50 is transferred by means of an "and" gate 74 through the logical "or" circuit 54 to the address register 48. The gate 74 is controlled by the output of a logical "and" circuit 76 to which is applied the F–4 state together with the 1 state of the Compare flip-flop 70. The output of the logical "and" gate 76 is coupled to the "and" gate 74 through a logical "or" circuit 78.

The output from the logical "and" circuit 76 is also used to reset the counter 58 and 60 back to 0 by means of a clock pulse passed by an "and" gate 80 to which the output of the logical "and" circuit 76 is applied through a logical "or" circuit 82. Also the Execute flip-flop 24 is set to the 1 state by the next clock pulse passed by an "and" gate 84 biased open by the output of the logical "and" circuit 76. This completes the addressing phase in which the memory 46 is addressed to the base address of the sequence of micro-operators required to carry out the necessary operations to complete the instruction in the processor 10.

In the above description, it was assumed that the character address placed in the counter 58 was 1 and therefore there was a comparison between the character counter 58 and the sequence counter 60. If the character counter 53 were set to any other value in response to the instruction in the memory register 16, the Compare flip-flop 70 would not be set to the 1 state at the end of the F–3 control state. Assuming that the Compare flip-flop 70 remained in the 0 state when the control state advanced to F–4, a high level is produced at the output of a logical "and" circuit 86 to which is applied the F–4 level together with the 0 state of the Compare flip-flop 70. The output from the logical "and" circuit 86 biases open an "and" gate 88 through a logical "or" circuit 90 so that the clock pulse at the end of the F–4 state is passed by the gate 88 to shift the shift register 50 to the right one character position. At the same time, the sequence counter 60 is counted up one by applying the output of the logical "and" circuit 86 to the gate 66. Also the control counter 26 is reset to the 3 state by applying the output of the logical "and" circuit 86 to an "and" gate 92 together with a clock pulse. The output of the gate 92 sets the counter 26 back to the 3 state.

With the control counter 26 back to 3, if the counters 58 and 60 are now the same, the Compare flip-flop 70 will be set to 1 in the manner described above and the selected character from the shift register 50 will be transferred to the address register 48. If the two counters still are not the same, the register 50 continues to be shifted and the sequence counter 60 continues to be counted up in the manner described, until a comparison is effected.

With the designated base address placed in the address register 48, the control counter 26 is reset by the output of the "and" gate 80. At the same time, the Execute flip-flop 24 is set to the 1 state. The outputs from the control counter 26 are applied together with the 1 state of the flip-flop 24 to a series of logical "and" circuits 96, 98, 100, 102, 104 and 106. Thus as the control counter 26 is advanced by successive clock pulses, the logical "and" circuits generate the control state E–1, E–2, E–3, E–4, E–5 and E–6.

During the E–1 state, the addressed control word in the memory 46 is transferred to the control word shift register 50 by applying the E–1 state to the "and" gate 52. At the same time, the address register 48 is counted up one by applying the E–1 state to an "and" gate 108 together with a clock pulse, the clock pulse passed by the gate 108 counting up the contents of the address register 48 by one.

During the next clock pulse interval, the E–2 control state is applied to the logical "and" circuit 64. Since the counters 58 and 60 have both been reset to 0, the comparison circuit 62 indicates that they are the same. Thus the Compare flip-flop 70 is set to the 1 state by the next clock pulse. During the following E–3 control state, a logical "and" circuit 110 senses that the Compare flip-flop 70 has been set to 1 and controls a gate 112 for coupling the first character position of the shift register 50 to a matrix decoder circuit 114.

The information stored in the first character position of the register 50 constitutes the first micro-operator in the string of micro-operators which control the execution of the particular instruction in the C-register 20. The matrix decoder 114 energizes one of a plurality of output lines 116 according to the value of the binary coded character applied to the input of the decoder through the "and" gate 112. The output lines from the output of the matrix decoder 114 are used in the processor 10 to effect a particular micro-operation in response to the next clock pulse.

The manner in which each of the micro-operations is carried out in the processor 10 is not important to the present invention. A large number of different micro-operations are possible according to the design of the processor 10. For example, one of the output lines 116 applied to the processor may cause information in the memory register 16 to be stored in the core memory 12. Another output line 116 may cause a single character of the word in the memory register 16 to be transferred to the arithmetic unit 22 and added to one character of the contents of an accumulator register in the arithmetic unit.

Such type of operations are well known in the prior art and the specific manner in which the control lines 116 effect particular operations within the processor need not be described further. However, it should be noted that a particular micro-operator can be repeated for any number of clock pulses if required. For this purpose a repeat counter 118 is provided that is normally in its 0 state. A group of micro-operators decoded by the matrix 114 may energize any one of a group of output lines 117 which are applied to a gating circuit 120 to which also is applied a clock pulse. At the end of the E–3 state, the clock pulse, depending upon which one, if any, of the micro-operators is present for setting the repeat counter, is passed by the gating circuit 120 to set the repeat counter 118 to a corresponding value. Obviously, if there is no micro-operator calling for a set of the repeat counter, the repeat counter remains at 0 at the end of the E–3 state.

The 0 state of the repeat counter 118 is sensed by a logical "and" circuit 122 which also senses the E–3 control state and senses that the sequence counter 60 is not at 7 by means of an inverter 132 coupled to the 7 state of the counter. The output of the logical "and" circuit 122 controls a gate 124 for passing a pulse to the character counter 58, causing the character counter to be counted up one. The output from the gate 124 is also used to reset the control counter 26 back to its number 2 state.

With the control state now back to E–2, a comparison between the counters 58 and 60 is again made, but this time, because the character counter 58 has been counted up one, it will no longer be the same as the sequence counter 60. Thus the Compare flip-flop 70 will not be set to 1. It should be noted that the Compare flip-flop 70 is reset to 0 by the next clock pulse whenever a Compare condition exists. This is controlled by applying the outputs of the logical "and" circuit 76 and the logical "and" circuit 110 through a logical "or" circuit 126 to a gating circuit 128 which passes the next clock pulse to reset the Compare flip-flop 70 back to its 0 state. A logical "and" circuit 130 senses that the Compare flip-flop 70 is in its 0 or reset state. It also senses that the sequence counter 60 is not in its maximum or number 7 state by virtue of an inverter 132 coupling the 7 state of the sequence counter 60 to the logical "and" circuit 130. The E–2 state is also applied to logical "and" circuit 130. If all conditions are true, the output of the logical "and" circuit 130 biases open the gate 88, permitting the next clock pulse to shift the regiser 50 one character position and bringing the next character into the 0 position of the register. At the same time, the sequence counter 60 is advanced one by applying the output from the logical "and" circuit 130 through a logical "or" circuit 132 to the "and" gate 66, permitting the next clock pulse to also advance the sequence counter 60. The output of the logical "and" circuit 130 is also applied through a logical "or" circuit 134 and an inverter 136 to the gate 38, thus inhibiting the advance of the control counter 26 and permitting the control counter to remain at the number 2 state.

Since the character counter 58 and sequence counter 60 are now the same, a comparison will be effected and the next micro-operator is coupled to the matrix decoder 114 through the gate 112 in the manner described above. Assuming that the repeat counter 118 had been set to some value other than 0 by the previous micro-operator, the control circuit will remain in the E–3 state for several clock pulse intervals determined by the value of the setting of the repeat counter 118. It should be noted that no pulse can be passed by the gating circuit 124 to reset the control counter 26 to 2 and to count up the character counter 58 until the repeat counter returns to its 0 condition.

The repeat counter is counted down by clock pulses passed by a gate 140. The gate 140 is biased open by a logical "and" circuit 142 which senses that control is in the E–3 state and senses by means of an inverter 144 connected to the 0 state of the repeat counter 118 that the repeat counter is not in the 0 state. When enough clock pulses are passed to count the repeat counter back down to 0, the control counter 26 is reset to the 2 state and the character counter 58 is advanced one, causing the register 50 to again shift and bring the next micro-operator character into the 0 position of the register 50.

When all eight characters of the word in the shift register 50 have been shifted through the 0 position, the sequence counter 60 will be advanced to the count 7 condition. When the sequence counter 60 is in the count 7 condition, the compare operation continues as before and the next micro-operator is read out of the shift register 50. A logical "and" circuit 148 senses that the sequence counter 60 is in the count 7 condition and senses when the repeat counter 118 is returned to the 0 condition and that the operation is in the E–3 state. If all these conditions are true, the output of the logical "and" circuit 148 is applied through the logical "or" circuit 82 to the gate 80 for resetting the counter 26, 58 and 60 back to their initial count conditions. This places the control back in the E–1 state, causing a memory read out operation for transferring the next word of micro-operators into the shift register 50. The operation then continues as described above.

Two micro-operators are of particular significance as far as the operation of the control circuitry is concerned. One of these micro-operators is referred to as an Unconditional Branch micro-operator and is designed to cause the control operation to bring out a new word from the memory 46 into the register 50. The next character to the left of the Unconditional Branch micro-operator is used as the address for bringing a new control word out of the memory 46. Assume, for example, that the control circuit is advanced to the E–3 state and an Unconditional Branch micro-operator is in the 0 position of the shift register 50. This is transferred to the matrix decoder 114 through the gate 112 where it is decoded, energizing a corresponding Unconditional Branch line 149 on the output of the matrix decoder 114. The Unconditional Branch line 149 is applied to the control counter 26 to immediately set the control counter 26 to its number 5 state. This provides an E–5 level at the output of the logical "and" circuit 104. The E–5 level is applied through the logical "or" circuit 78 to the gate 74 permitting the next adjacent character in the micro-operator word stored in the register 50 to be transferred to the address register 48. The clock pulse at the conclusion of the E–5 control state causes the addressed word in the memory 46 to be placed in the register 50. The E–5 control state is also applied to the logical "or" circuit 82 to permit the next clock pulse to also reset the counters 26, 58 and 60. Operation continues as before using the new group of micro-operators placed in the register 50.

One other micro-operator which is of special significance to the control circuitry is the Operation Complete micro-operator. This micro-operator is used to signal that the instruction has been fully executed and that a new instruction should be brought out of the core memory 12 and placed in the C-register 20 of the processor 10. When an Operation Complete micro-operator is encountered, an appropriate line 151 on the output of the matrix decoder 114 causes the control counter 26 to be set to the count 6 condition setting up the E–6 control state at the output of the logical "and" circuit 106. The E–6 level is applied through the logical "or" circuit 82 to the gate 80 causing the counters 26, 58 and 60 to be reset by the next clock pulse. The E–6 level is also applied together with a clock pulse to a gate 150, the output of which resets the Execute flip-flop 24 to the 0 state. The Operation Complete line 151 from the output of the matrix decoder 114 is also used in the processor to clear the C-register 20 and to prepare the processor for the next fetch operation.

From the above description, it will be recognized that a control circuit is provided for a digital processor in which the basic instructions can be readily modified by changing the micro-operators which control the operation of the process during the execution of the instruction. The basic programming can remain the same. By the indirect addressing technique, the micro-operators used during a particular instruction in a program can be modified without changing the instruction in any way. This simplifies the task of the programmer.

What is claimed is:

1. A control unit for a digital processor in which stored instructions are executed in sequence, the control unit including an instruction word register, a control word register, the control word register storing a group of binary coded characters, a decoder, means for coupling one of the character storing portions of the control word register to the decoder, whereby one character in the control word is decoded at a time, a read-out memory for storing a plurality of control words, means responsive to coded address information in each instruction as it is placed in the instruction word register by the processor for addressing a word in the read-out memory and placing the word in the control word register, means including a counter for successfully coupling each character in the control register to the decoder, the decoder providing a signal on a different output line for each different value of character coupled to the decoder, the output lines from the decoder being coupled to the processor to control the processor, means for transferring additional control words in address sequence from the read-out memory to the control word register when the counter indicates that all the characters in the last control word have been coupled to the decoder, means responsive to a particular output line from the decoder for addressing and transferring a new control word from the read-out memory to the control register in response to the value of the next character in sequence in the existing word in the control register, and means responsive to another particular output line from the decoder for causing the processor to bring a new instruction into the instruction register.

2. A control unit for a digital processor in which stored instructions are executed in sequence, the control unit including an instruction word register, a control word register, the control word register storing a group of binary coded characters, a decoder, means for coupling one of the character storing portions of the control word register to the decoder, whereby one character in the control word is decoded at a time, a read-out memory for storing a plurality of control words, means responsive to coded address information in each instruction as it is placed in the instruction word register by the processor for addressing a word in the read-out memory and placing the word in the control word register, means including a counter for successfully coupling each character in the control register to the decoder, the decoder providing a signal on a different output line for each different value of character coupled to the decoder, the output lines from the decoder being coupled to the processor to control the processor, means for transferring additional control words in address sequence from the read-out memory to the control word register when the counter indicates that all the characters in the last control word have been coupled to the decoder, and means responsive to a particular output line from the decoder for addressing and transferring a new control word from the read-out memory to the control register in response to the value of the next character in sequence in the existing word in the control register.

3. A control unit for a digital processor in which stored instructions are executed in sequence, the control unit including an instruction word register, a control word register, the control word register storing a group of binary coded characters, a decoder, means for coupling one of the character storing portions of the control word register to the decoder, whereby one character in the control word is decoded at a time, a read-out memory for storing a plurality of control words, means responsive to coded address information in each instruction as it is placed in the instruction word register by the processor for addressing a word in the read out memory and placing the word in the control word register, means including a counter for successfully coupling each character in the control register to the decoder, the decoder providing a signal on a different output line for each different value of character coupled to the decoder, the output lines from the decoder being coupled to the processor to control the processor, and means for transferring additional control words in address sequence from the read-out memory to the control word register when the counter indicates that all the characters in the last control word have been coupled to the decoder.

4. A control unit for a digital processor in which stored instructions are executed in sequence, the control unit including a control word register, the control word register, the control word register storing a group of binary coded characters, a decoder, means for coupling one of the characters storing portions of the control word register to the decoder, whereby one character in the control word is decoded at a time, means for storing a plurality of control words, means responsive to coded address information in each instruction for addressing a word in the storing means and placing the word in the control word register, means for successfully coupling each character in the control register to the decoder, the decoder providing a signal on a different output line for each different value of character coupled to the decoder, the output lines from the decoder being coupled to the processor to control the processor, and means for transferring additional control words in address sequence from the storing means to the control word register when all the characters in the last control word have been coupled to the decoder.

5. A control unit for a digital computer in which instructions are executed in sequence, each instruction requiring a sequence of operations and each operation requiring a single clock interval, the control unit including a clock pulse source, an instruction word register, a control word register, an addressable memory unit for storing a plurality of characters in coded form, each different value of character representing a different computer operation, means responsive to a portion of the bits of an instruction word stored in the instruction register and representing a base address of a string of characters in the memory unit for addressing and reading out a group of characters from the memory unit to the control word register, means including a decoder coupled to the register for decoding each character in sequence, said last-named means including counter means operated from the clock pulse source for applying a particular character in the control word register to the decoder for a number of clock intervals determined by the setting of the counter, and means responsive to the decoder output for setting the counter to a particular value, whereby a particular operation-defining character can be applied to the decoder for any predetermined number of clock pulse intervals.

References Cited by the Examiner

Chu, Y.: "Digital Computer Design Fundamentals," October 1962, McGraw-Hill, pp. 461–466.

ROBERT C. BAILEY, *Primary Examiner.*

M. LISS, *Assistant Examiner.*